May 23, 1933.  J. JENSEN  1,910,838
TOOL FOR PUNCHING, RIVETING, AND LIKE OPERATIONS
Filed Jan. 12, 1931
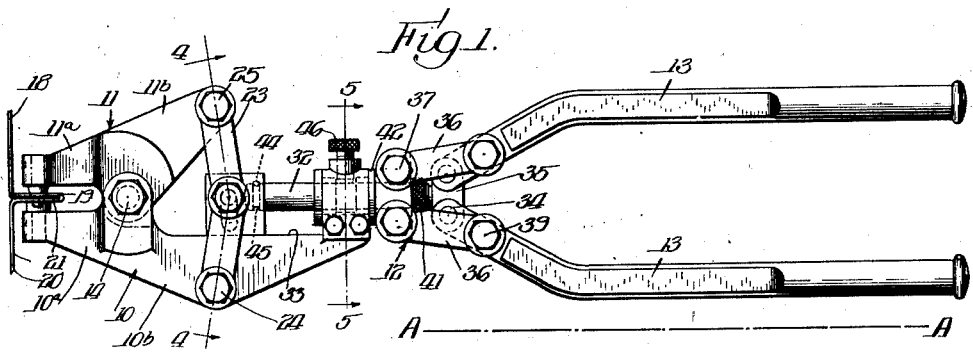
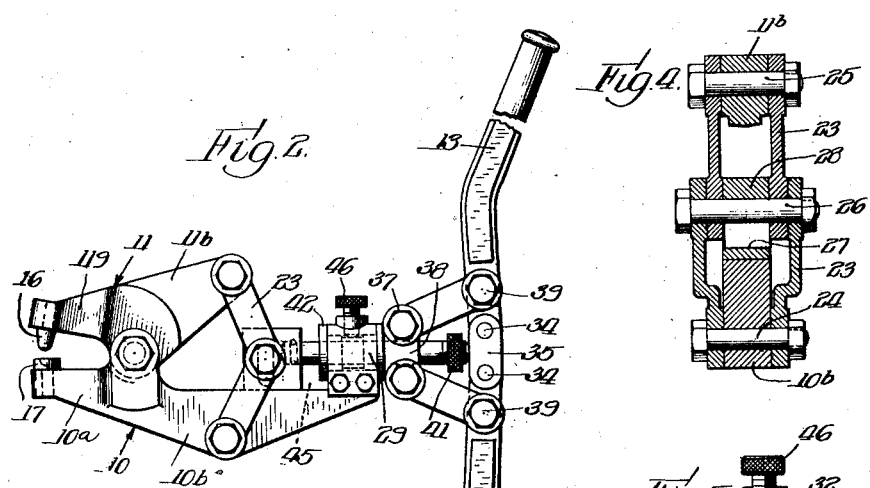
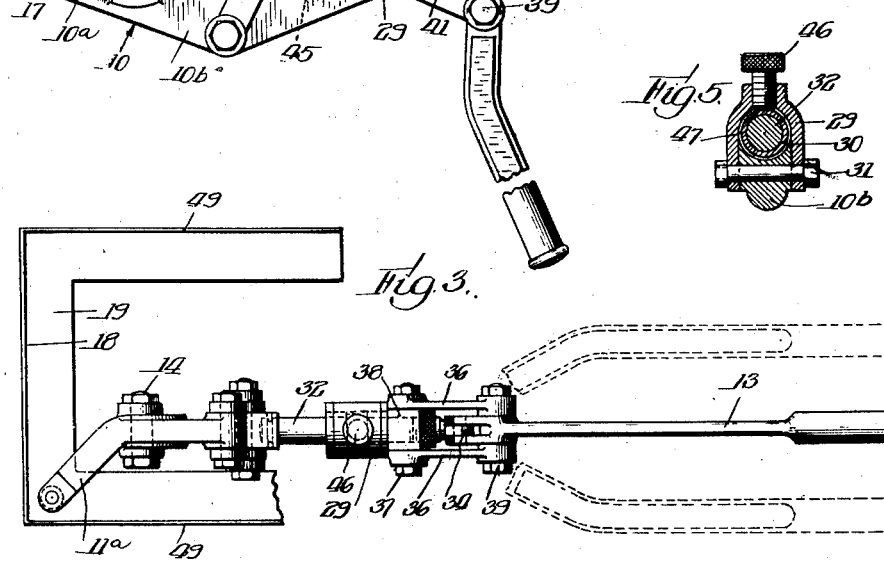
Inventor:—
John Jensen
By Churchill Parker & Carlson Patented May 23, 1933

1,910,838

UNITED STATES PATENT OFFICE

JOHN JENSEN, OF ROCKFORD, ILLINOIS, ASSIGNOR TO WHITNEY METAL TOOL COMPANY, OF ROCKFORD, ILLINOIS, A CORPORATION OF ILLINOIS

TOOL FOR PUNCHING, RIVETING, AND LIKE OPERATIONS

Application filed January 12, 1931. Serial No. 508,250.

The invention relates generally to tools for performing punching, riveting or similar operations and more particularly it relates to a manually operable tool of this character.

Such tools usually embody relatively movable jaws carrying opposed dies thereon, together with a pair of handles movable with relation to each other and operable to open and close the jaws. Space conditions about the portions of the work upon which an operation is to be performed often render it difficult to perform the operation with tools of ordinary construction.

The primary object of the present invention is to provide an efficient tool of this character having a novel arrangement of the various operating parts thereof whereby to tool is adapted for use in a variety of different situations.

Another object is to provide such a manually operable tool capable of performing an operation closely adjacent to the corner of a box-like piece of work when that corner is in closely spaced relation to another corner so as to limit the movement or positioning of the tool with relation to the work.

Another object is to provide a manually operable tool of this character wherein the operating dies may be readily seen by the operator at all times and particularly when the tool is being held in an upwardly extending position for performing work above the operator's head.

The above and other objects are attained in the present embodiment of the invention through the provision of a jaw structure projecting at an angle from one end of an elongated supporting body together with a manual operating device rotatably mounted on the other end of the body and operable in all of its rotative positions to actuate the jaw structure.

Another object is to provide a new and improved mounting for rotatably supporting the jaw structure of such a tool upon the manual operating device.

Another object is to provide such a tool having new and simplified adjusting means for determining the closed position of the jaws.

Other objects and advantages will become apparent from the following description taken in connection with the accompanying drawing, in which Figure 1 is an elevational view of a tool embodying the preferred form of the invention with the jaws and the associated parts shown in closed relation to one form of work.

Fig. 2 is a view similar to Fig. 1 with the jaws and the associated parts shown in their open positions.

Fig. 3 is a plan view of the structure shown in Fig. 1.

Figs. 4 and 5 are sectional views taken along the lines 4—4 and 5—5 respectively of Fig. 1.

In the preferred form shown herein, the invention is embodied in a tool having a pair of jaws 10 and 11 mounted for movement toward and from each other by an operating device designated generally by the numeral 12 which carries the two jaws and includes a pair of relatively movable handles 13 operatively connected to the jaws. The jaws 10 and 11 are, in the present case, pivoted together at 14 intermediate their ends to form arms 10$^a$ and 11$^a$ extending in one direction from the pivot 14 in spaced relation to each other. The space between the arms 10$^a$ and 11$^a$ constitutes a throat into which work may project in order that it may be operated upon by complemental, opposed dies 16 and 17 which are mounted adjacent to the free ends of the two arms.

The dies 16 and 17 in the form shown are shaped to form a spherical projection on the work positioned between the two jaws, and these dies are intended particularly for use in securing sheet metal parts together. Thus, in the drawings a wall section 18 of sheet metal has a U-shaped flange 19 projecting at right angles at one edge thereof and an adjacent wall section 20 has a flange 21 projecting from its edge into the U-shaped flange 19. By laterally deforming the two flanges 19 and 21 at points spaced from the edges of the flanges as by forming a transversely extending projection thereon, the flange 21 is held within the flange 19 and the two wall sections 18 and 20 are held in fixed relation to each other.

Extending on the other side of the pivot 14, the jaws 10 and 11 provide arms 10$^b$ and 11$^b$ positioned at an angle to each other when the jaws are in their closed position and adapted to be drawn together from the position shown in Fig. 1 to the position shown in Fig. 2 in order to open the jaws. Such opening and closing movement of the jaws is preferably obtained by toggle links 23 interposed between the two arms 10$^b$ and 11$^b$. Thus a pair of links 23 positioned on opposite sides of the arm 10$^b$ (Figs. 1 and 4) are pivoted thereto by a bolt 24 while two links 23 on opposite sides of the arm 11$^b$ are connected to that arm by a bolt 25. The other ends of the links 23 are pivotally connected to each other by a bolt 26 passing through an aperture 27 in a block 28 which acts as a spacer between the links.

For the purpose of mounting the jaws 10 and 11 on the operating device 12, the arm 10$^b$ of the jaw 10, is extended beyond the point of connection with the links so that it constitutes in effect an elongated body for the tool. At its extended end the arm 10$^b$ is provided with a bracket or a yoke 29 surrounding a sleeve 30 (Figs. 1 and 5) which constitutes part of the operating device 12. The yoke is secured on the arm by bolts 31. Within the sleeve 30 a rod 32 is slidably mounted for transmitting movement from the operating handles 13 to the toggle links 23 and for this purpose one end of the rod 32 is connected to the block 28. The block 28 is preferably arranged to slide along a surface 33 on the arm 10$^b$ which is parallel to the axis of the rod, and since this path of movement does not correspond with the path of movement of the bolt 26, the aperture 27 in the block is enlarged laterally as shown in Figs. 1 and 4 to permit movement of the bolt 26 laterally of the block as the toggle is operated.

To reciprocate the rod 32, the corresponding ends of the handles 13 are pivoted at 34 on parallel axes on a cross bar 35 fixed on the other end of the rod 32, and each handle 13 is also connected to the sleeve 30 by a pair of similarly positioned links 36 pivoted at 37 to a head 38 on the sleeve 30 and pivoted at 39 to the handles at points spaced from the pivots 34 of the handles. It will be seen that separation of the outer ends of the two handles 13 to the positions shown in Fig. 2 will withdraw the rod 32 and cause the jaws of the tool to be opened. It will also be seen that the links 36 and the portions of the handles between the pivots 34 and 39 constitute, in effect, toggles operable to reciprocate the rod 32. These toggles are of such a character that their maximum force-multiplying action takes place at a time when the toggle links 23 are approaching their extended positions so that the tool may be operated with a minimum exertion by the operator.

Adjacent to the cross bar 35 the rod 32 is threaded to receive a knurled nut 41 adapted for adjustment along the rod and arranged to abut the head 38 to limit the approaching movement of the jaws 10 and 11 and thereby prevent undue deformation of the work.

In the use of the device the handles 13, moving in a plane perpendicular to their pivotal axes 34, require considerable space as is clearly shown in Fig. 2 of the drawing, and, in accordance with the present invention, provision is made for changing the plane of movement of the handles 13 with relation to the jaws 10 and 11. To this end the yoke 29 surrounding the sleeve 30 is held against endwise movement by annular flanges 42 (Figs. 1 and 2) formed on the sleeve, and the yoke is fitted with sufficient looseness to permit rotation of the yoke about the axis of the sleeve. To permit such rotation, the connection between the rod 32 and the block 28 is formed by extending the end of the rod into a bore in the block and fixing it therein by a pin 44 engaging an annular groove 45 formed in the rod.

If desired, the operating device 12 may be held in the desired relation to the jaws solely by the friction between the parts, or it may be fixed in the desired relation by a set screw 46 extending through the yoke 29 and engaging the sleeve 30. Preferably the sleeve has an annular groove 47 formed therein upon the bottom of which the screw 46 is arranged to act. In this construction the yoke rotates upon the bearing surfaces provided by the surface of the sleeve between the groove 47 and the flanges 42, and the bottom of the groove which may be roughened by the screw 46, is out of contact with the yoke.

As an example of the utility of this construction, let it be assumed that the flanges 19 and 21 are to be secured together and that there is an obstruction located on the line A—A in Fig. 1 of the drawings which would prevent separation of the handles 13 in a plane perpendicular to the pivot 14 of the jaws. Under such circumstances the operating device 12 may be rotated about the axis of the rod 32 until the handles operate in a plane parallel to the pivotal axes 14 of the jaws as shown in dotted outline in Fig. 3. The handles may then be separated without striking the obstruction.

Tools of this character herein shown are often shown to perform work above the operator's head and the jaws 10 and 11 are preferably arranged to position the dies 16 and 17 within the view of the operator when performing such over-head work. This is accomplished by forming the arms 10ª and 11ª so as to extend from the pivot 14 at an angle to the arms 10ᵇ and 11ᵇ (Fig. 3). It will be noted that with this construction the arm 10ᵇ forms, in effect, an elongated body for the tool and that, in the preferred construction shown, the arms 10ª and 11ª are positioned at an angle of substantially 45° to the axis of the elongated body thus provided. With this construction the workman looking along the tool parallel to the body thereof is able to see the dies and to position them accurately upon the work.

This offset positioning of the dies 16 and 17 increases the utility of the tool in operating upon the many forms of work. For example, it will be noted in Fig. 3 of the drawing that the wall sections 18 and 20 have two closely spaced corners formed by transversely extending side walls 49 (Fig. 3). With this form of work the joint formed by the flanges 19 and 21 may be secured together immediately adjacent to the corners by positioning the body of the tool parallel to one of the side walls 49 with the arms 10ª and 11ª extending angularly into the corner so as to embrace the two flanges.

Taken in connection with the rotatable mounting of the operating device 12, the angular positioning of the arms 10ª and 11ª permits the use of the tool to operate upon joints in comparatively close corners as shown in Fig. 3, even in the presence of an obstruction located on the line A—A as above described.

From the foregoing it will be apparent that the invention provides an effective manually operable tool adapted for use in a large variety of situations wherein limited space would ordinarily render the operation quite difficult.

I claim as my invention:

1. A tool of the character described comprising in combination, an elongated body, a pair of relatively movable jaws on one end of said body both projecting therefrom in the same direction at an angle of substantially 45° to the longitudinal axis of the body, a member mounted on the other end of said body for rotation about said axis, a pair of operating handles mounted on said member, one of said handles being pivotally connected to said member for movement toward and away from the other handle, and means connecting said movable handle to said jaws operable to move said jaws relatively in any rotative position of said member on said jaw-carrying body.

2. In a tool of the character described, the combination of an elongated body, a pair of relatively movable opposed jaws on one end of said body projecting from said body at an angle to the longitudinal axis of said body, opposed dies mounted on the projecting ends of said jaws, a member rotatably mounted on the other end of said body, a pair of operating handles mounted on said member, one handle being pivoted for movement toward and away from the other, and means connecting said pivoted handle to one of said jaws operable to transmit movement from the handle to the jaw in any rotative position of said member on said body.

3. A tool of the character described comprising a body having a fixed jaw and an opposed movable jaw thereon, a toggle on said body connected to said movable jaw for moving the same, and an operating device comprising a member rotatably mounted on said body, and means connected to said member and said toggle for actuating said toggle in any rotative position of said member, said means including a second toggle and an operating handle therefor.

4. In a tool of the character described the combination of a body having a pair of opposed jaws thereon, one of said jaws being movable toward the other, a rod longitudinally movable along said body, and having one end operatively connected to said movable jaw for actuating the same, a guide mounted on said body and surrounding said rod intermediate its ends, an operating handle mounted on said body and connected to the other end of said rod for reciprocating the rod, and a nut threaded on said rod between said other end thereof and said guide and operable to limit the jaw closing movement of said handle.

5. A tool of the character described having a body, a pair of relatively movable opposed jaws on said body, a toggle operatively connected to said jaws and operable to cause relative movement of said jaws, and an operating device comprising a member rotatably mounted on said body, and means connected to said member and said toggle for actuating said toggle in any rotative position of said member, said means including a second toggle and an operating handle therefor.

In testimony whereof, I have hereunto affixed my signature.

JOHN JENSEN.